(12) United States Patent
    Pilon

(10) Patent No.: US 11,740,423 B2
(45) Date of Patent: Aug. 29, 2023

(54) TRAY SYSTEM FOR PROVIDING MODULAR CASSETTE CONFIGURATIONS IN A FIBER OPTIC MANAGEMENT SYSTEM

(71) Applicant: BELDEN CANADA ULC, Saint-Laurent (CA)

(72) Inventor: Vincent Pilon, Lachine (CA)

( * ) Notice: Subject to any disclaimer, the term of this patent is extended or adjusted under 35 U.S.C. 154(b) by 5 days.

(21) Appl. No.: 18/105,639

(22) Filed: Feb. 3, 2023

(65) Prior Publication Data

US 2023/0185046 A1 Jun. 15, 2023

Related U.S. Application Data

(63) Continuation of application No. 17/929,566, filed on Sep. 2, 2022, which is a continuation of application No. 17/010,113, filed on Sep. 2, 2020, now Pat. No. 11,435,542, which is a continuation of application No. 16/143,831, filed on Sep. 27, 2018, now Pat. No. 10,795,107.

(60) Provisional application No. 62/567,339, filed on Oct. 3, 2017.

(51) Int. Cl.
    *G02B 6/44* (2006.01)
    *G02B 6/46* (2006.01)

(52) U.S. Cl.
    CPC ............. *G02B 6/4455* (2013.01); *G02B 6/46* (2013.01)

(58) Field of Classification Search
    None
    See application file for complete search history.

(56) References Cited

U.S. PATENT DOCUMENTS

| | | | |
|---|---|---|---|
| 4,792,203 A | 12/1988 | Nelson et al. | |
| 7,331,722 B2 | 2/2008 | Tan | |
| 7,509,015 B2 | 5/2009 | Murano | |
| 8,913,866 B2 | 12/2014 | Cote et al. | |
| 9,008,485 B2 | 4/2015 | Ramirez et al. | |
| 9,075,216 B2 | 7/2015 | Cote et al. | |
| 9,690,064 B2 | 6/2017 | Sauter et al. | |
| 10,042,135 B2 * | 8/2018 | Murray | G02B 6/4455 |
| 10,215,944 B2 | 2/2019 | Sedor et al. | |
| 10,281,672 B1 | 5/2019 | Mullsteff | |
| 10,359,595 B2 | 7/2019 | Aramayo et al. | |
| 10,514,518 B1 | 12/2019 | Livingston et al. | |
| 10,598,884 B2 | 3/2020 | Fontaine et al. | |

(Continued)

*Primary Examiner* — Rhonda S Peace
(74) *Attorney, Agent, or Firm* — Lavery, de Billy LLP; Hugh Mansfield

(57) ABSTRACT

A tray for providing a plurality of different modular fiber optic cassette configurations may comprise a tray member that may support a plurality of different modular fiber optic cassette configurations in a standard U-space width. The different modular fiber optic cassette configurations may include different sizes of modular fiber optic cassettes. Each of the different sizes of modular fiber optic cassettes may support a fiber optic receptable module that may fit in a standard one width (1 W) unit. The plurality of different sizes of modular fiber optic cassettes may include a 2 W cassette size that may fit a standard two width (2 W) unit (relative to the standard one width, (1 W) unit), a 3 W cassette size that may fit a standard three width (3 W) unit, a 4 W cassette size that may fit a standard four width (4 W) unit, and/or a 6 W cassette size that may fit a standard six width (6 W) unit.

30 Claims, 13 Drawing Sheets

(56) References Cited

U.S. PATENT DOCUMENTS

| | | |
|---|---|---|
| 10,656,359 B2 | 5/2020 | Fontaine et al. |
| 10,670,822 B2 * | 6/2020 | Vogel .................. G02B 6/4455 |
| 10,768,387 B2 | 9/2020 | Pilon et al. |
| 10,795,107 B2 | 10/2020 | Pilon |
| 10,809,479 B2 * | 10/2020 | Crawford ............. G02B 6/4453 |
| 11,187,864 B2 | 11/2021 | Crawford et al. |
| 11,333,842 B2 * | 5/2022 | Ma ....................... G02B 6/4452 |
| 11,435,542 B2 * | 9/2022 | Pilon .................... G02B 6/4455 |
| 2002/0131730 A1 | 9/2002 | Keeble et al. |
| 2007/0131628 A1 | 6/2007 | Mimlitch |
| 2009/0290842 A1 | 11/2009 | Bran de Leon et al. |
| 2016/0033732 A1 | 2/2016 | Giraud et al. |
| 2016/0062050 A1 | 3/2016 | Giraud et al. |
| 2016/0062055 A1 | 3/2016 | Giraud et al. |
| 2016/0062058 A1 * | 3/2016 | Dagley ................ G02B 6/3879 385/56 |
| 2016/0062068 A1 | 3/2016 | Giraud et al. |
| 2018/0003912 A1 * | 1/2018 | Sedor .................. G02B 6/4455 |
| 2019/0004268 A1 | 1/2019 | Vogel |
| 2019/0101717 A1 | 4/2019 | Pilon |
| 2019/0107682 A1 | 4/2019 | Aramayo et al. |
| 2019/0162924 A1 | 5/2019 | Fontaine et al. |
| 2019/0187394 A1 | 6/2019 | Fontaine et al. |

\* cited by examiner

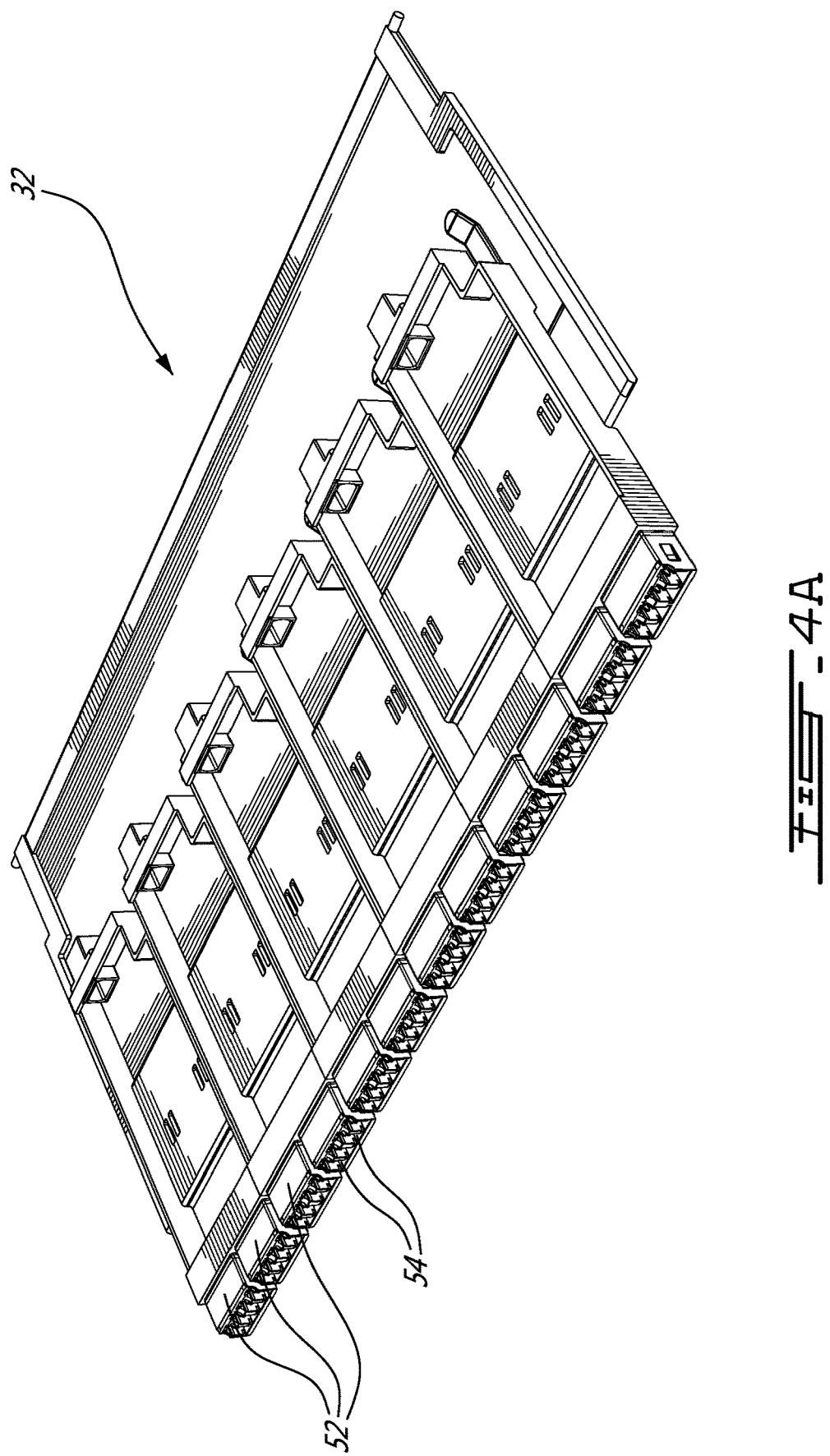

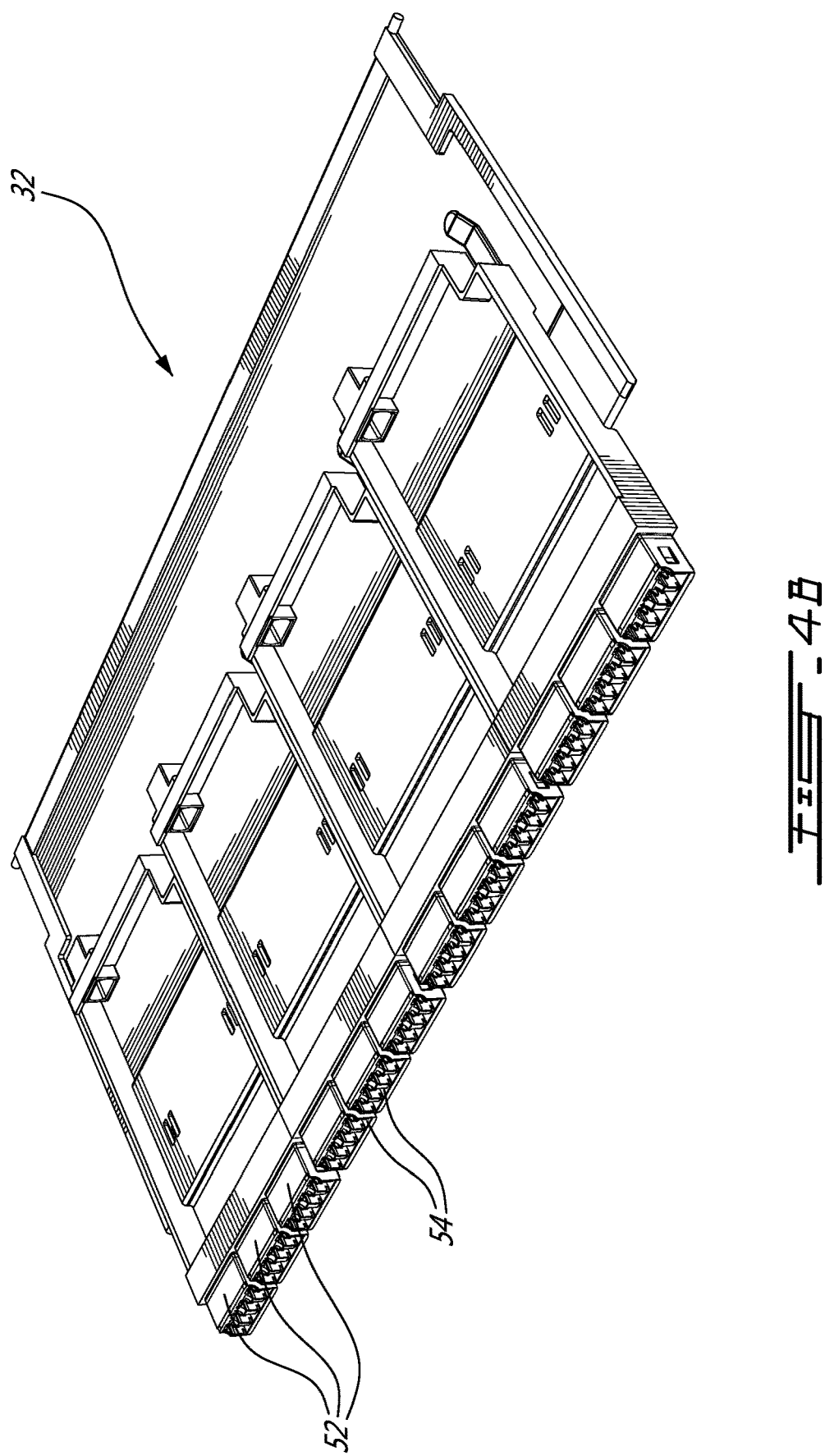

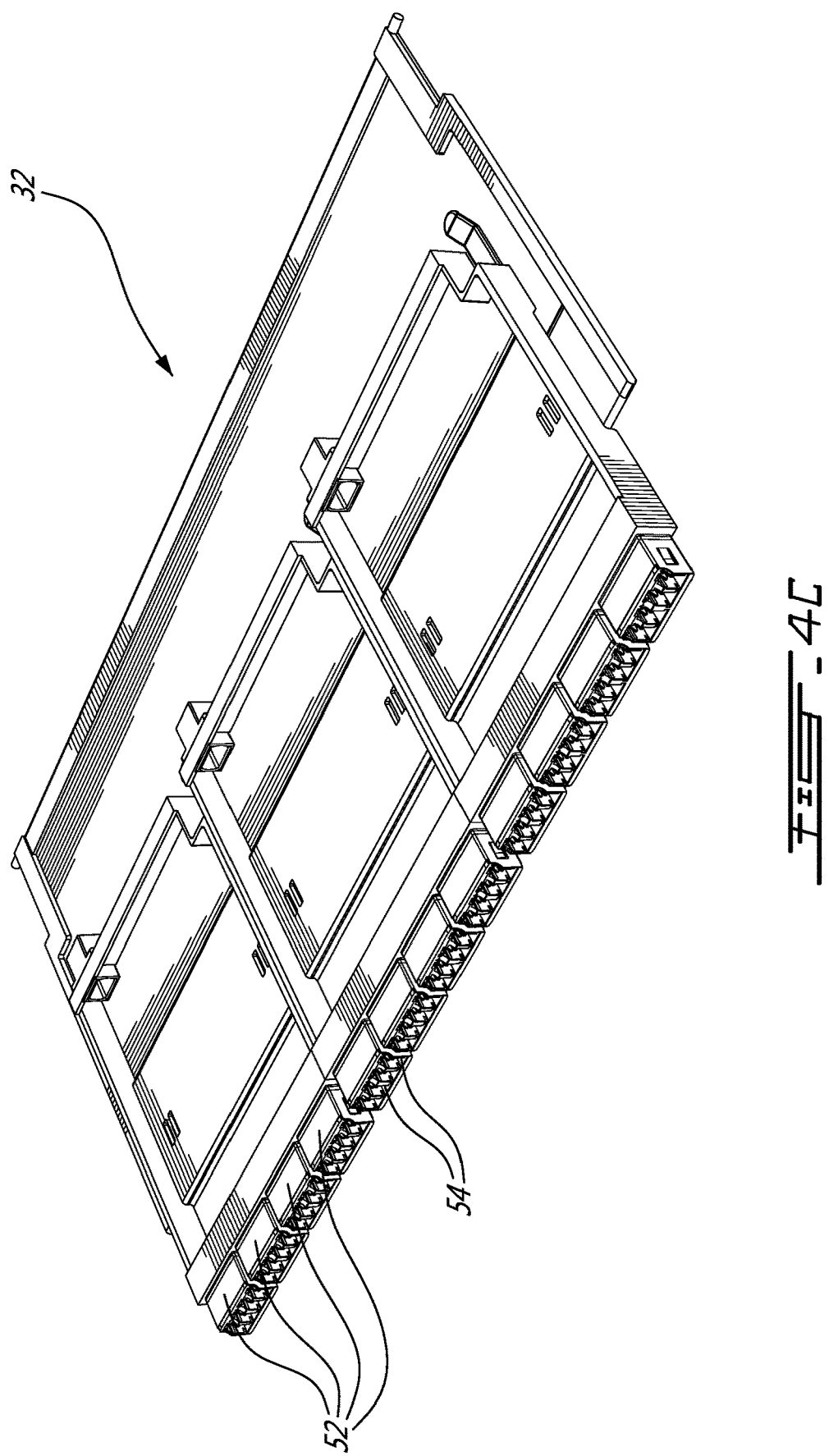

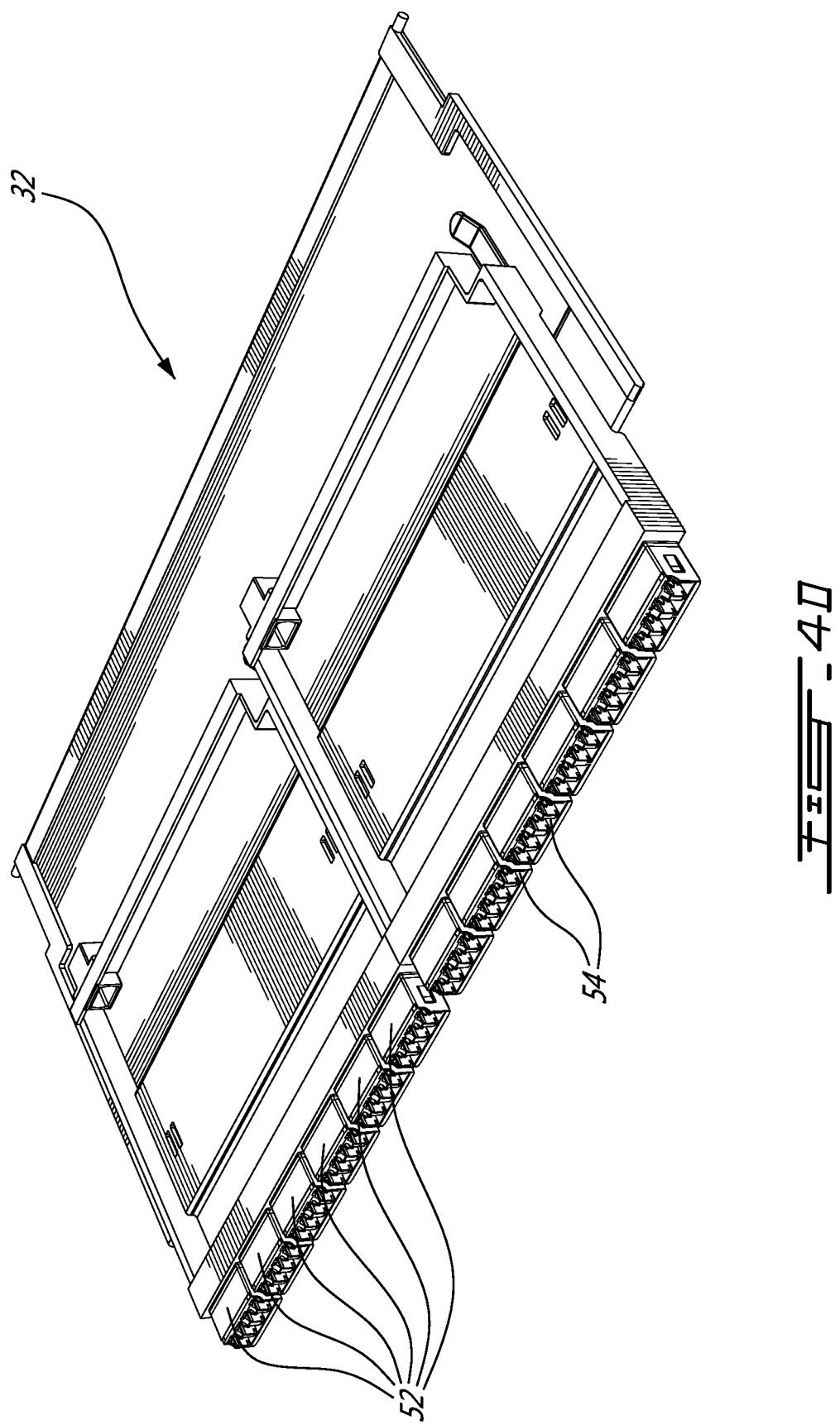

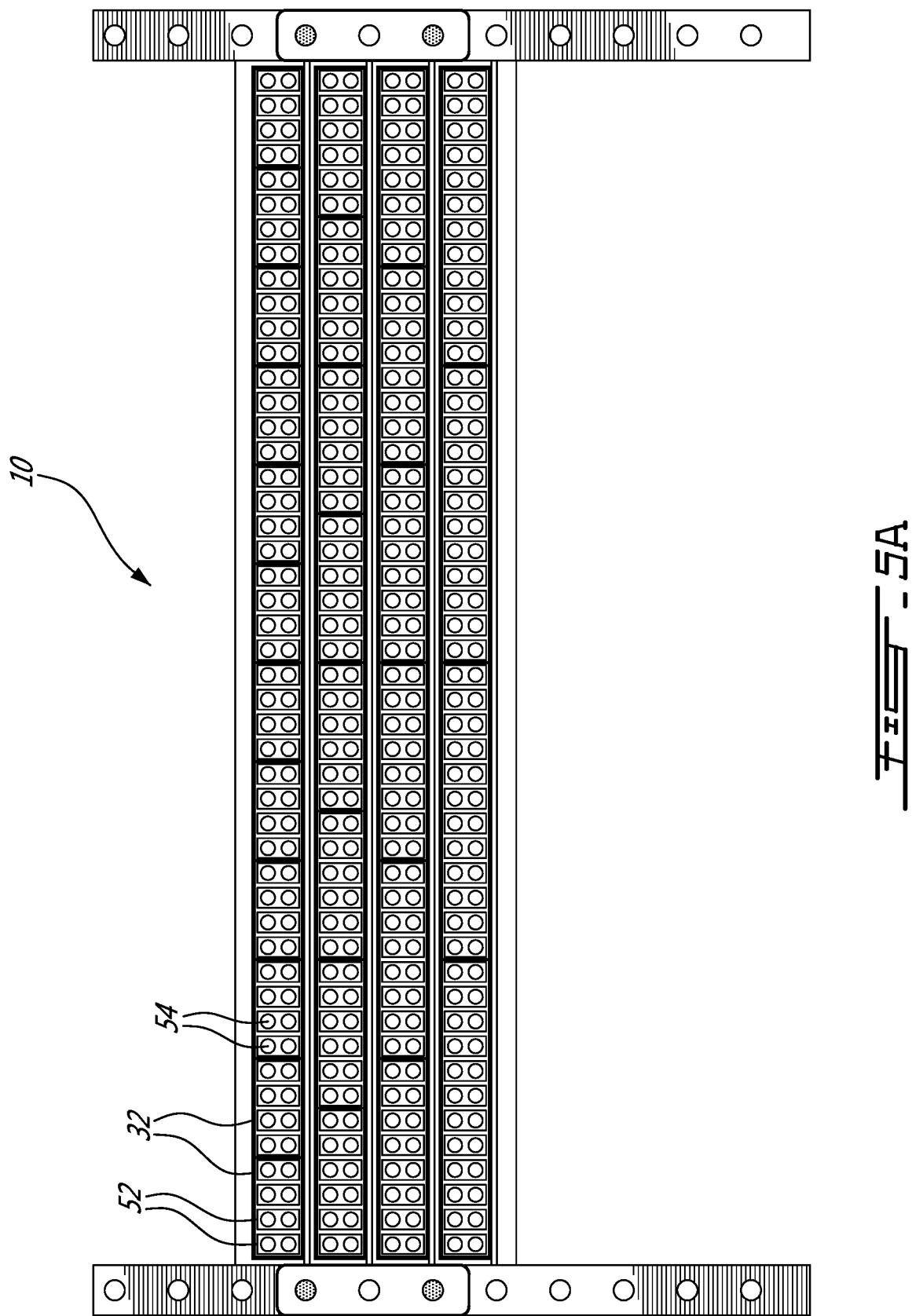

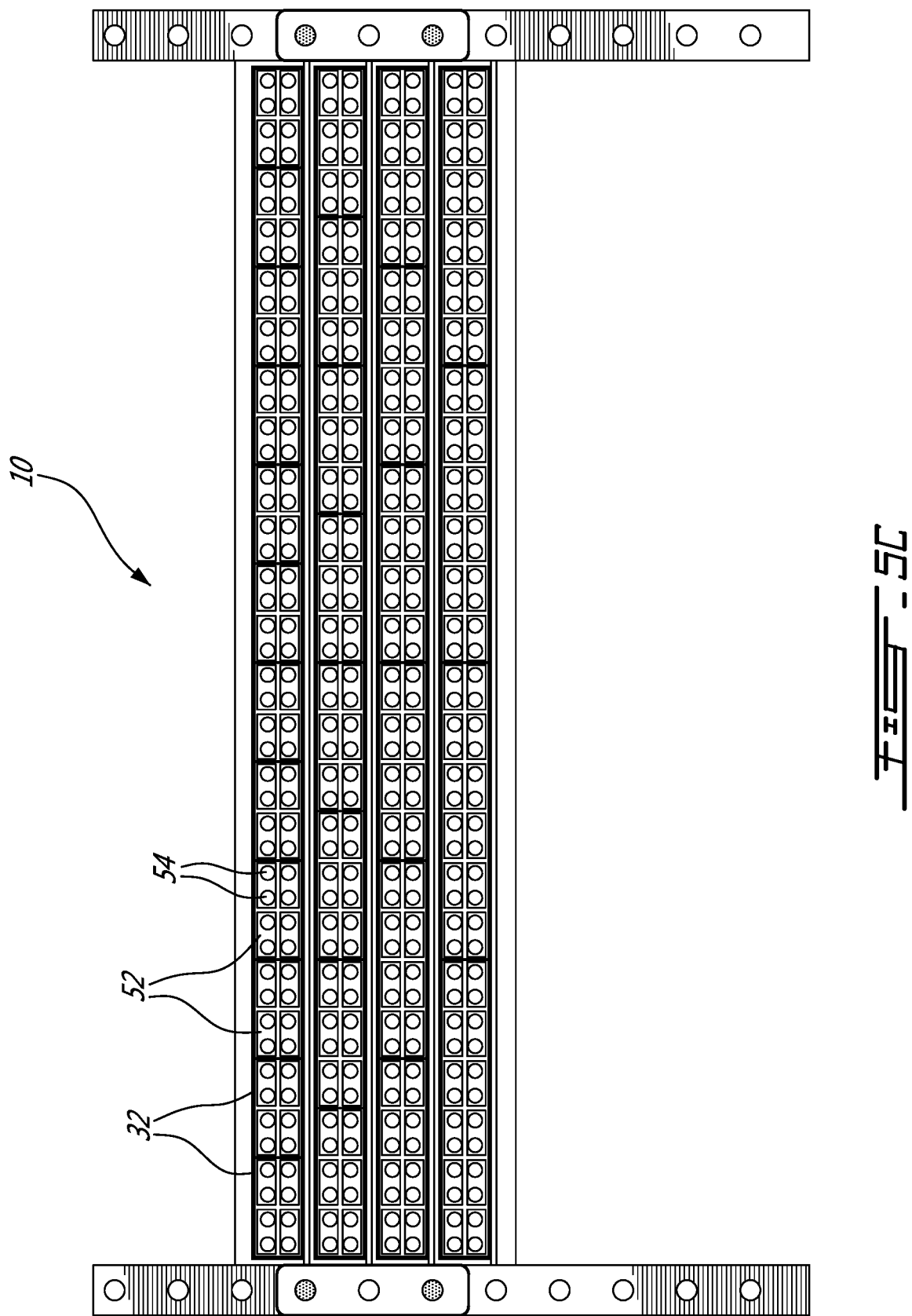

TRAY SYSTEM FOR PROVIDING MODULAR CASSETTE CONFIGURATIONS IN A FIBER OPTIC MANAGEMENT SYSTEM

CROSS REFERENCE TO RELATED APPLICATIONS

This application is a continuation application of U.S. patent application Ser. No. 17/929,566 filed on Sep. 2, 2022, which is in turn a continuation application of U.S. patent application Ser. No. 17/010,113 filed on Sep. 2, 2020, now U.S. Pat. No. 11,435,542, which is in turn a continuation application of U.S. patent application Ser. No. 16/143,831 filed on Sep. 27, 2018, now U.S. Pat. No. 10,795,107, which in turn claims priority under 35 USC § 119(e) of U.S. provisional application Ser. No. 62/567,339 filed on Oct. 3, 2017. All the above documents are incorporated herein in their entirety by reference.

FIELD OF THE INVENTION

The present invention relates to a tray system for providing modular cassette configurations in a fiber optic management system. In particular, the present invention relates to a tray for providing a plurality of modular cassette configurations in a fiber optic management system that may include a fiber optic cassette comprising a width of one or more standard width units such that fiber optic cassettes of different widths can be arranged on the same tray while optimizing the use of tray space.

BACKGROUND OF THE INVENTION

The prior art discloses fiber optic cassettes or splice boxes for use in terminating fiber optic trunk cables and splitting them out to patch cables which are removeably arranged on tray systems within a rack mounted case. One drawback of these cassettes and tray systems is that they are typically preconfigured to terminate fiber optic cables comprising a single predetermined number of optic fibers. Another drawback is that cassettes which are used to terminate fiber optic cables comprising different numbers of optic fibers are generally incompatible with one another and additionally require trays with different spacing, securing mechanisms and the like.

SUMMARY OF THE INVENTION

According to various exemplary embodiments of the disclosure, a tray for providing a plurality of different modular fiber optic cassette configurations in a standard U-space fiber optic management system may comprise a tray having a first tray side end portion and a second tray side end portion defining a tray width portion extending between the first tray side end portion and the second tray side end portion. The tray width portion may fit within a standard U-space width dimension and the tray is configured to fit a plurality of different modular fiber optic cassette configurations in the tray width portion in a standard U-space fiber management system. Each of the plurality of different modular fiber optic cassette configurations may include a modular fiber optic cassette that is configured to support a receptable module having a first module side end portion and a second module side end portion defining a module width portion extending between the first tray side end portion and second tray side end portion. The module width portion may be configured to fit in a standard one width (1 W) unit. Each of the modular fiber optic cassettes may include a first cassette side end portion and a second cassette side end portion defining a standard cassette width unit extending between the first cassette side end portion and the second cassette side end portion that comprises a standard two width (2 W) unit, a standard three width (3 W) unit, a standard four width (4 W) unit, or a standard a standard six width (6 W) unit relative to the standard one width (1 W) unit. The receptable module is configured to fit at least four fiber optic plug receiving receptacle portions in a standard one width (1 W) unit. The plurality of different modular fiber optic cassette configurations may comprise a first modular fiber optic cassette configuration that may include six modular two standard width unit (2 W) cassettes that are each arranged side by side of each other along the tray such that a cassette side end portion of each modular two standard width (2 W) cassette adjacently faces a cassette side end portion of at least one other modular two standard width (2 W) cassette, a second modular fiber optic cassette configuration that may include four modular three standard width unit (3 W) cassettes that are each arranged side by side of each other in a row along the tray such that a cassette side end portion of each modular three standard width (3 W) cassette adjacently faces a cassette side end portion of at least one other modular three standard width (3 W) cassette, a third modular fiber optic cassette configuration that may include three modular four standard width unit (4 W) cassettes that are each arranged side by side of each other in a row along the tray such that a cassette side end portion of each modular four standard width (4 W) cassette adjacently faces a cassette side end portion of at least one other modular four standard width (4 W) cassette, a fourth modular fiber optic cassette configuration that may include two modular six standard width unit (6 W) cassettes that are each arranged side by side of each other in a row along the tray such that a cassette side end portion of one of the two modular six standard width (6 W) cassettes adjacently faces a cassette side end portion of the other modular six standard width (6 W) cassette, and a fifth modular fiber optic cassette configuration that may include three modular two standard width unit (2 W) cassettes, which are each arranged side by side of each other in a row along the tray such that a cassette side end portion of one of the three modular two standard width (2 W) cassettes adjacently faces a cassette side end portion of one of the other modular two standard width (2 W) cassette, and one modular six standard width unit (6 W) cassette that is arranged side by side in a row along the tray with one of the three modular two standard width unit (2 W) cassettes, such that a cassette side end portion of the one modular six standard width unit (6 W) cassette may adjacently face a cassette side end portion of one of the other three modular two standard width unit (2 W) cassettes. Each modular two standard width (2 W) cassette may be configured to fit two receptacle modules, each modular three standard width (3 W) cassette may be configured to fit three receptacle modules, each modular four standard width (4 W) cassette may be configured to fit four receptacle modules, and each modular six standard width (6 W) cassette is configured to fit six receptacle modules. The tray may be configured to be removably secured to each modular fiber optic cassette when the tray fits the plurality of different modular fiber optic cassette configurations within the tray width portion in the standard U-space fiber management system. The tray also may include a plurality of cassette engaging portions that are configured to conform to the standard one width (1 W) so as to support the modular two standard width (2 W) cassette, the modular three standard width (3 W) cassette, the modular four standard width (4 W) cassette, and/or the modular six standard width (6 W) cassette.

In some exemplary and non-limiting aspects, the standard one width (1 W) unit is based on a standard SC Duplex width unit that may be configured to fit a plurality of different type of LC, SC, and MPO connectors. According to some other exemplary and non-limiting aspects, the plurality of cassette engaging portions of the tray may be spaced apart from one another so as to conform to the standard one width (1 W) and support the modular two standard width (2 W) cassette, the modular three standard width (3 W) cassette, the modular four standard width (4 W) cassette, and the modular six standard width (6 W) cassette.

In various exemplary and non-limiting aspects, the tray may be configured to be slidingly received in at least a portion of a tray receiving space of a case of a fiber optic management system. In some other exemplary and non-limiting aspects, each of the modular fiber optic cassettes may include a cassette side end portion that is directly adjacent to a cassette side end portion of another module fiber optic cassette when each of the modular fiber optic cassettes are in the plurality of the plurality of different modular fiber optic cassette configurations. In some other exemplary and non-limiting aspects, each of the modular fiber optic cassettes may include a cassette side end portion that may be located adjacent to a cassette side end portion of another module fiber optic cassette when each of the modular fiber optic cassettes are in the plurality of the plurality of different modular fiber optic cassette configurations.

In some exemplary and non-limiting aspects, each of the modular fiber optic cassettes may include a cassette side end portion that touches a cassette side end portion of another module fiber optic cassette when each of the modular fiber optic cassettes are in the plurality of the plurality of different modular fiber optic cassette configurations. In some other exemplary and non-limiting aspects, the tray may have a first tray end portion and a second tray end portion that may be spaced away from the first tray end portion so as to define a tray width that may extend between the first tray end portion and the second tray end portion, and wherein the tray width may be configured to fit at least twelve standard one width (1 W) units side by side along the tray width.

In accordance with various exemplary and non-limiting embodiments of the disclosure, a tray for providing a plurality of different modular fiber optic cassette configurations in a standard U-space fiber optic management system may comprise a tray configured to fit in a standard U-space and support a plurality of different modular fiber optic cassette configurations in the standard U-space. Each of the plurality of different modular fiber optic cassette configurations may include a plurality of different sizes of modular fiber optic cassettes. Each of the plurality of different sizes of modular fiber optic cassettes may be configured to support a fiber optic receptable module that is configured to fit in a standard one width (1 W) unit. The plurality of different sizes of modular fiber optic cassettes may include a 2W cassette size that is configured to fit a standard two width (2 W) unit relative to the standard one width (1 W) unit, a 3 W cassette size that may be configured to fit a standard three width (3 W) unit relative to the standard one width (1 W) unit, a 4 W cassette size that may be configured to fit a standard four width (4 W) unit relative to the standard one width (1 W) unit, and a 6 W cassette size that may be configured to fit a standard six width (6 W) unit relative to the standard one width (1 W) unit. The plurality of different modular fiber optic cassette configurations may comprise a first modular fiber optic cassette configuration that may include six modular 2 standard width unit size cassettes that may each be arranged side by side of each other along the tray such that a cassette side end portion of each modular 2 standard width unit size cassette may adjacently face a cassette side end portion of at least one other modular 2 standard width size cassette, a second modular fiber optic cassette configuration that may include four modular 3 W standard width unit size cassettes that may each be arranged side by side of each other in a row along the tray such that a cassette side end portion of each modular 3 W standard width size cassette may adjacently face a cassette side end portion of at least one other modular 3 W standard width size cassette, a third modular fiber optic cassette configuration that may include three modular 4 W standard width unit size cassettes that may each be arranged side by side of each other in a row along the tray such that a cassette side end portion of each modular 4 W standard width size cassette may adjacently face a cassette side end portion of at least one other modular 4 W standard width size cassette, a fourth modular fiber optic cassette configuration that may include two modular 6 W standard width unit size cassettes that may each be arranged side by side of each other in a row along the tray such that a cassette side end portion of one of the two modular 6 W standard width size cassettes may adjacently face a cassette side end portion of the other modular 6 W standard width size cassette, and a fifth modular fiber optic cassette configuration that may include three modular 2 standard width unit size cassettes, which may each be arranged side by side of each other in a row along the tray such that a cassette side end portion of one of the three modular 2 standard width size cassettes may adjacently face a cassette side end portion of one of the other modular 2 standard width size cassette, and one modular 6 W standard width unit size cassette that may be arranged side by side in a row along the tray with one of the three modular 2 standard width unit size cassettes, such that a cassette side end portion of the one modular 6 W standard width unit size cassette may adjacently face a cassette side end portion of one of the other three modular 2 standard width unit size cassettes. The tray may be configured to be removably secured to each modular fiber optic cassette when the tray fits the plurality of different modular fiber optic cassette configurations within a tray width portion in the standard U-space fiber management system and the tray may include a plurality of cassette engaging portions that may be configured to conform to the standard one width (1 W) so as to support the modular 2 standard width unit size cassette, the modular 3 W standard width unit size cassette, the modular 4 W standard width unit size cassette, and the modular 6 W standard width unit size cassette.

In various aspects, the standard one width (1 W) unit may be based on a standard SC Duplex width unit that may be configured to fit a plurality of different type of LC, SC, and MPO connectors.

According to some aspects, the plurality of cassette engaging portions of the tray may be spaced apart from one another so as to conform to the standard one width (1 W) and support the modular 2 standard width unit size cassette, the modular 3 W standard width unit size cassette, the modular 4 W standard width unit size cassette, and/or the modular 6 W standard width unit size cassette. In some aspects, the tray may be configured to be slidingly received in at least portion of a tray receiving space of a case of a fiber optic management system.

According to some aspects, each of the modular fiber optic cassettes may include a cassette side end portion that may be located directly adjacent to a cassette side end portion of another module fiber optic cassette when each of the modular fiber optic cassettes are in the plurality of the plurality of different modular fiber optic cassette configurations. In some aspects, each of the modular fiber optic cassettes may include a cassette side end portion that is adjacent to a cassette side end portion of another module fiber optic cassette when each of the modular fiber optic cassettes are in the plurality of the plurality of different modular fiber optic cassette configurations. In some aspects, each of the modular fiber optic cassettes may include a cassette side end portion that touches a cassette side end portion of another module fiber optic cassette when each of the modular fiber optic cassettes are in the plurality of the plurality of different modular fiber optic cassette configurations.

In various aspects, the tray may have a first tray end portion and a second tray end portion that may be spaced away from the first tray end portion so as to define a tray width that may extend between the first tray end portion and the second tray end portion, and wherein the tray width may be configured to support at least twelve standard one width (1 W) units side by side along the tray.

In accordance with various exemplary embodiments of the disclosure, a tray for providing a plurality of different modular fiber optic cassette configurations in a fiber optic management system may comprise a tray member that may be configured to support a plurality of different modular fiber optic cassette configurations in a standard U-space width. The plurality of different modular fiber optic cassette configurations may include different sizes of modular fiber optic cassettes. Each of the different sizes of modular fiber optic cassettes may be configured to support a fiber optic receptable module that may be configured to fit in a standard one width (1 W) unit. The plurality of different sizes of modular fiber optic cassettes may include a 2 cassette size that may be configured to fit a standard two width (2 W) unit relative to the standard one width (1 W) unit, a 3 W cassette size that may be configured to fit a standard three width (3 W) unit relative to the standard one width (1 W) unit, a 4 W cassette size that may be configured to fit a standard four width (4 W) unit relative to the standard one width (1 W) unit, and a 6 W cassette size that may be configured to fit a standard six width (6 W) unit relative to the standard one width (1 W) unit. The plurality of different modular fiber optic cassette configurations may comprise a first modular fiber optic cassette configuration that may include six modular 2 standard width unit size cassettes that each may be arranged side by side of each other along the tray member such that a cassette side end portion of each modular 2 standard width unit size cassette adjacently faces a cassette side end portion of at least one other modular 2 standard width size cassette, a second modular fiber optic cassette configuration that may include four modular 3 W standard width unit size cassettes that are each arranged side by side of each other in a row along the tray member such that a cassette side end portion of each modular 3 W standard width size cassette adjacently faces a cassette side end portion of at least one other modular 3 W standard width size cassette, a third modular fiber optic cassette configuration that may include three modular 4 W standard width unit size cassettes that are each arranged side by side of each other in a row along the tray member such that a cassette side end portion of each modular 4 W standard width size cassette adjacently faces a cassette side end portion of at least one other modular 4 W standard width size cassette, and/or a fourth modular fiber optic cassette configuration that may include two modular 6 W standard width unit size cassettes that are each arranged side by side of each other in a row along the tray member such that a cassette side end portion of one of the two modular 6 W standard width size cassettes adjacently faces a cassette side end portion of the other modular 6 W standard width size cassette. The tray member may be configured to conform to the standard one width (1 W) so as to support the modular 2 standard width unit size cassette, the modular 3 W standard width unit size cassette, the modular 4 W standard width unit size cassette, and the modular 6 W standard width unit size cassette.

In some aspects, the standard one width (1 W) unit may be based on a standard SC Duplex width unit that may be configured to fit a plurality of different type of LC, SC, and MPO connectors. In some aspects, the tray member may include a row of cassette engaging portions that may be spaced apart from one another so as to conform to the standard one width (1 W) and support the modular 2 standard width unit size cassette, the modular 3 W standard width unit size cassette, the modular 4 W standard width unit size cassette, and the modular 6 W standard width unit size cassette.

In various aspects, the row of cassette engaging portions may comprise a first row of cassette engaging portions, and the tray may include a second row of cassette engaging portions that may be spaced away from the first row of cassette engaging portions. In some aspects, the first row of cassette engaging portion may comprise a first row of slot portions that each may be configured to engage a tab portion of each modular cassette. In some aspects, the tray member may be configured to be slidingly received in at least portion of a tray member receiving space of a case of a fiber optic management system.

In some aspects, each of the modular fiber optic cassettes may include a cassette side end portion that may be located directly adjacent to a cassette side end portion of another module fiber optic cassette when each of the modular fiber optic cassettes are in the plurality of the plurality of different modular fiber optic cassette configurations. In accordance with some aspects, each of the modular fiber optic cassettes may include a cassette side end portion that may be adjacent to a cassette side end portion of another module fiber optic cassette when each of the modular fiber optic cassettes are in the plurality of the plurality of different modular fiber optic cassette configurations.

In accordance with some aspects, each of the modular fiber optic cassettes may include a cassette side end portion that may touch a cassette side end portion of another module fiber optic cassette when each of the modular fiber optic cassettes are in the plurality of the plurality of different modular fiber optic cassette configurations. In some aspects, the tray member may have a tray member width that may be configured to support at least twelve standard one width (1 W) units side by side along a row. In some aspects, the tray member may have a first tray member end portion and a second tray member end portion that may be spaced away from the first tray member end portion so as to define a tray member width that may extend between the first tray member end portion and the second tray member end portion, and wherein the tray member width may be configured to support at least twelve standard one width (1 W) units side by side along the tray member.

According to some aspects each of the modular fiber optic cassettes may comprise a multi-fiber connector receiving receptacle portion arranged on a rear portion thereof. In some aspects, each of the modules fiber optic cassettes may comprise four fiber optic plug receiving receptacle portions that may be configured to be arranged side by side in a row along a front portion thereof for each standard width (1 W)

unit. In some aspects, the tray member may comprise a cassette fastening portion that may be configured to removably secure the tray member to each modular fiber optic cassette.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

BRIEF DESCRIPTION OF THE DRAWINGS

FIGS. 4A through 4D provide raised right front perspective views of a tray populated with respectively six (6), four (4), three (3) and two (2) cassettes of different widths;

FIG. 5A, 5B and 5C provide front plan views of a modular fiber optic cassette and system mounted in a rack respectively in accordance with first, second and third alternative embodiments of the present invention;

DETAILED DESCRIPTION OF THE ILLUSTRATIVE EMBODIMENTS

Figure 1:
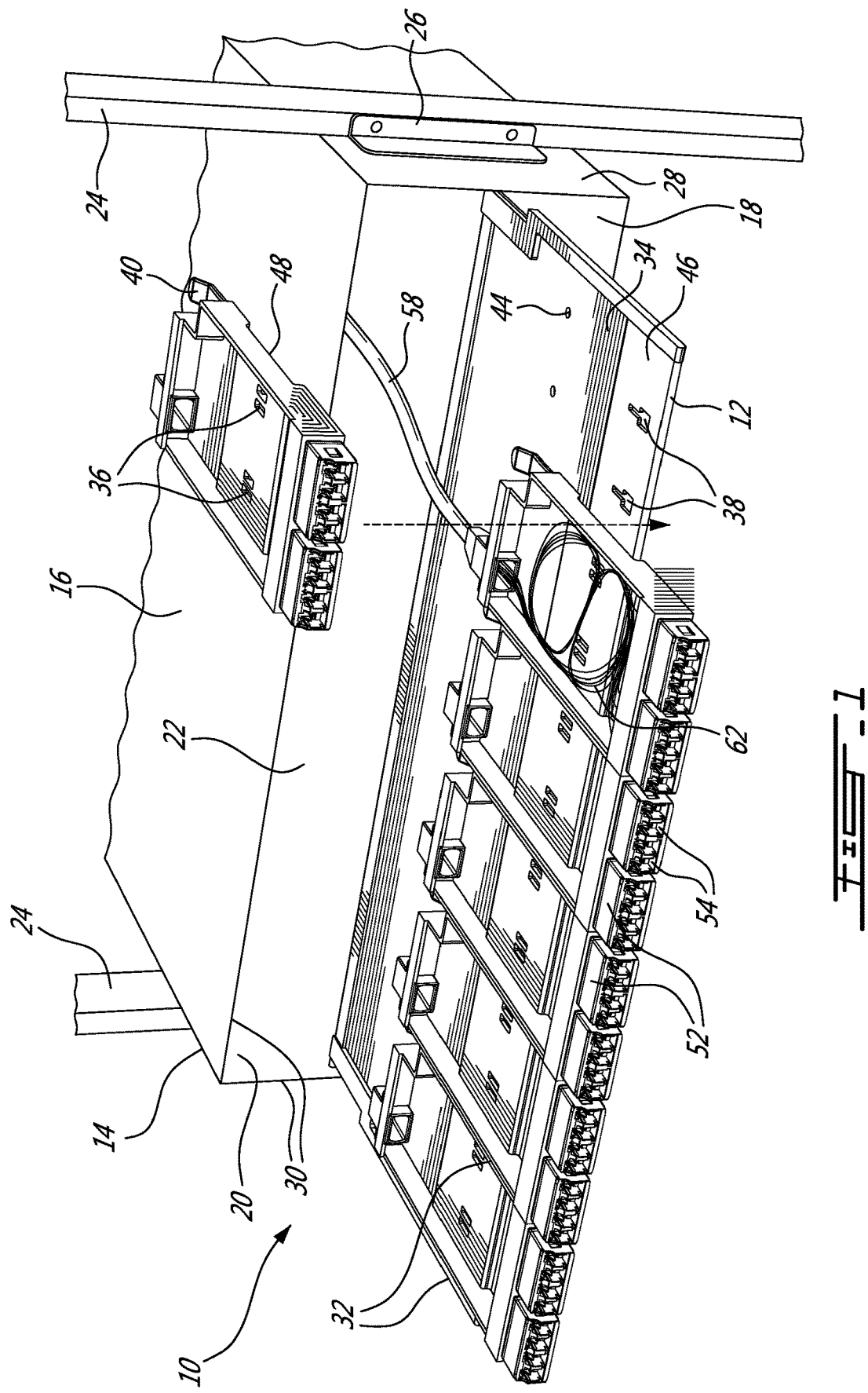
FIG. 1 provides a right front perspective view of a modular fiber optic cassette and system mounted in a rack and in accordance with an illustrative embodiment of the present invention.

Referring now to FIG. 1, a modular cassette system, generally referred to using the reference numeral 10, will now be described. The modular cassette comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed. In a particular illustrated embodiment the system 10 is shown for mounting in a 19" rack, however in a particular embodiment the system 10, with suitable modifications, may be mounted equally in a cross connect system, fiber bay or wall mount or the like.

Figure 2:
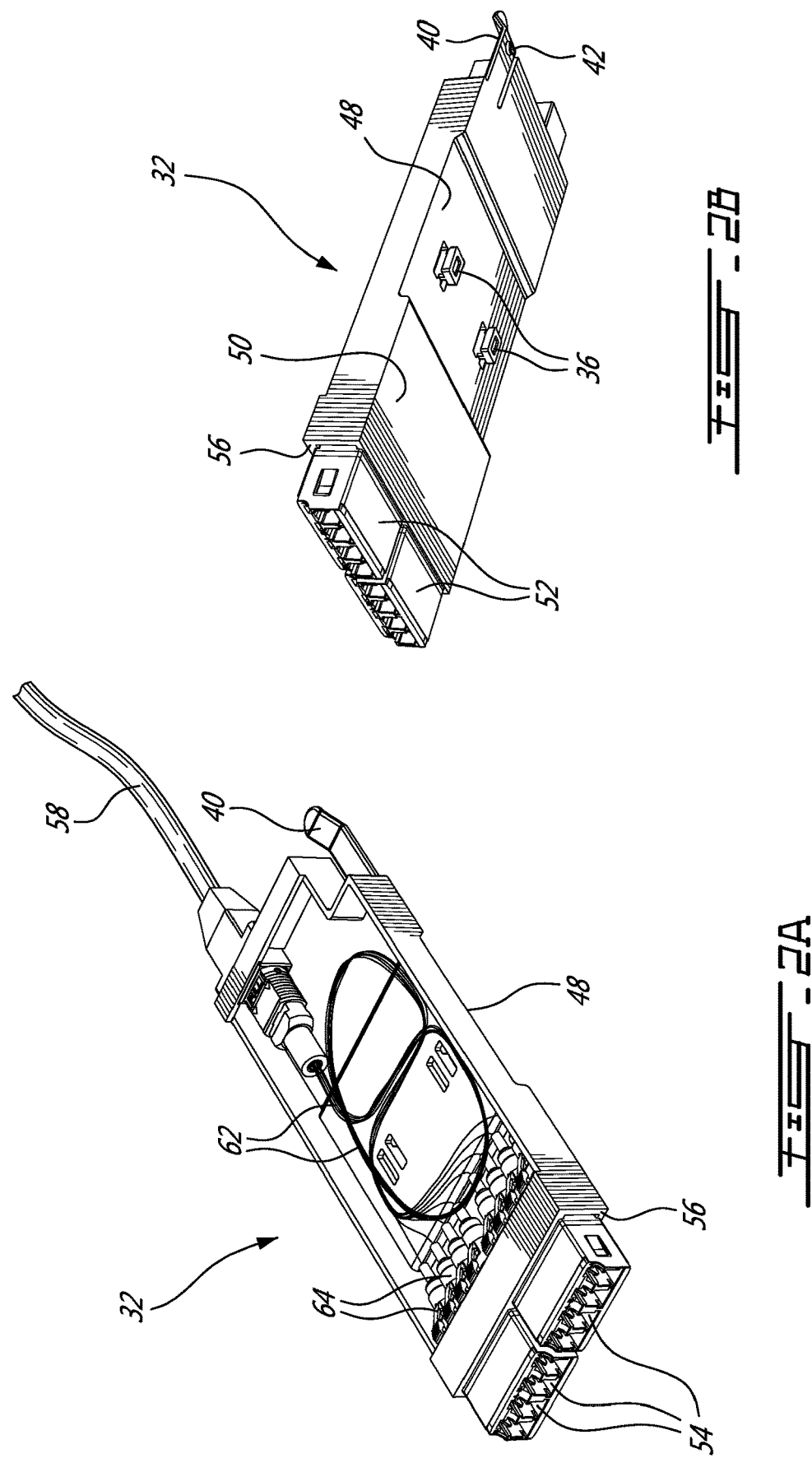
FIGS. 2A and 2B provide respectively a raised right front perspective view and a lowered right front perspective view of a modular fiber optic cassette in accordance with an illustrative embodiment of the present invention.
Figure 3:
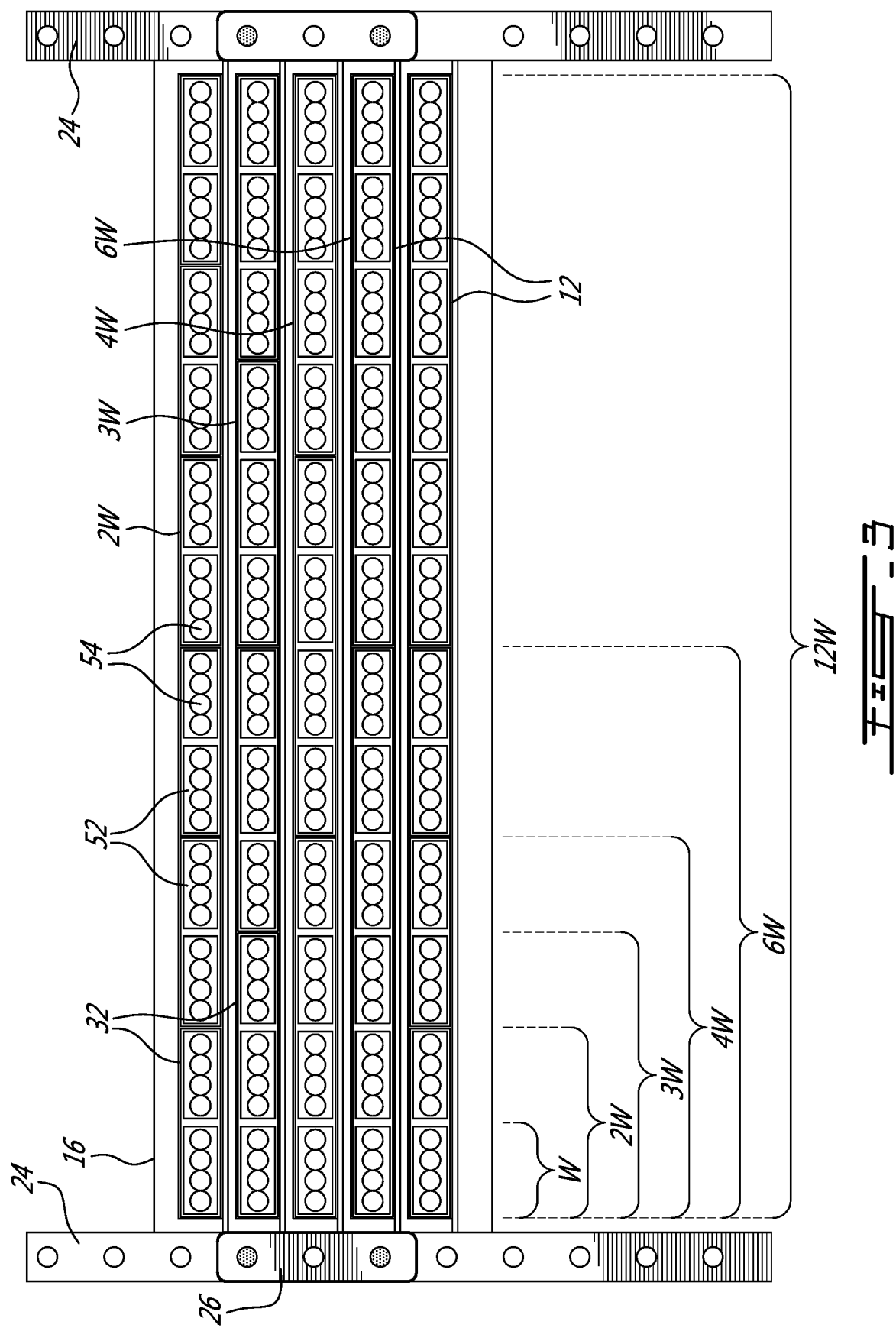
FIG. 3 provides a front plan view of a modular fiber optic cassette system mounted in a rack in accordance with an illustrative embodiment of the present invention.

Referring to FIGS. 2A and 2B in addition to FIG. 1, the tray 12 receives a plurality of removable fiber optic module or cassettes 32 arranged side by side on an upper surface 34 thereof. In a first embodiment each fiber optic cassette 32 is secured to the tray 12 using a fastener comprising tabs 36 of inverted "T" cross section which engage with respective slots 38 machined or otherwise formed in the tray 12. A flexible tab 40 is also provided which comprises a boss 42 that engages a respective aperture 44 machined or otherwise formed in the tray 12 when the tabs 36 are engaged within their respective slots 38, thereby releasably securing the cassette 32 to the tray 12. In order to better orient the cassette 36 on the tray during installation, the tray 12 comprises a raised shoulder 46 which is received within a channel 48 moulded or otherwise formed in an underside 50 of the cassette 32.

Still referring to FIGS. 2A and 2B, each cassette 32 illustratively comprises a plurality of receptacle modules 52 each comprising a plurality of receptacles 54, illustratively LC Quad type receptacles, arranged in a row and exposed along a forward edge 56 of the cassette 32. The cassette 32 also illustratively terminates a fiber optic cable 58, such as a trunk cable or the like, comprising a plurality of optic fibers at a multi-fiber connector receiving receptacle 60 on a rearward edge. Each optic fiber of the fiber optic cable 58 is interconnected with a respective one of the receptacles 54 using an optic fiber segment 62 comprising a receptacle end which is terminated by a plug 64. The segments 62, which are typically longer than the distance between the forward edge and the rearward edge, are typically looped several times within the cassette 32, for example in a serpentine or the like. A person of ordinary skill in the art will understand that an optic fiber terminated with a plug (not shown) inserted into a selected one of the receptacles 54 will interconnect the optic fiber with a selected optic fiber segment 62.

Referring now to FIG. 3 and FIGS. 4A through 4D, as discussed above, each cassette 32 illustratively comprises a plurality of receptacle modules 52 each comprising four (4) receptacles 54. It is foreseen to provide a set of four (4) different cassette sizes to accommodate terminating fiber optic cables comprising different number of optic fibers. Each of the different cassette sizes of the set is based on an integer multiple of a standardised pitch or width unit W wherein one standardized width unit accommodates a single receptacle module 52 comprising four (4) receptacles 54. Illustratively, a 2 cassette 32 comprising two (2) modules 52 accommodating eight (8) optic fibers (FIG. 4A) is provided, a 3 W cassette 32 comprising three (3) modules 52 accommodating twelve (12) optic fibers (FIG. 4B) is provided, a 4 W cassette 32 comprising four (4) modules 52 accommodating sixteen (16) optic fibers (FIG. 4C) is provided and a 6 W cassette 32 comprising six (6) modules 52 accommodating twenty-four (24) optic fibers (FIG. 4D) is provided for. The 2W, 3W, 4 W and 6 W cassettes 32 are typically used only with like cassettes 32 as illustrated and such that respectively six (6), four (4), three (3) and two (2) cassettes fit snuggly side by side on the 12 W tray, although in a particular embodiment cassettes 32 of different widths could be used together.

Although the present illustrative embodiment In a particular embodiment the pitch/width W is based on a LC Quad (SC Duplex) technology footprint comprising four (4) connectors, in an alternative embodiment the pitch/width W could be based on a different technology footprint, including SC Duplex comprising two (2) connectors and MPO type connectors comprising inter alia multiple optic fibers such as MPO-12, MPO-16 and MPO-24.

Still referring to FIGS. 3, 4A through 4D in addition to FIG. 1, a person of ordinary skill in the art will now understand that the disclosed system of cassettes 32 can be used to accommodate optic fiber cables 58 comprising different numbers of optic fibers 62 while ensuring that the same number of optic fibers 62 are accessible via the exposed receptacles 54.

Referring back to FIG. 1, the spacing between adjacent slots 38 as well as the spacing between adjacent apertures 44 conforms to the standardised width unit W and such that the 2 W, 3 W, 4 W and 6 W cassettes 32 can be readily accommodated on the tray.

Referring now to FIG. 5A, in a first alternative embodiment of the system each receptacle modules 52 comprises a duplex type module arranged vertically. Additionally in a first cassette size four (4) of such duplex modules 52 are provided to provide for eight (8) receptacles 54 for terminating a fiber optic cable (not shown) comprised of eight (8) optic fibers. Similar to the first embodiment discussed above, sizes for twelve (12), sixteen (16) and twenty four (24) receptacles are also provided. Again, as the width of the cassettes is an integer multiple of the same pitch/width, cassettes of different widths can be used in the same tray system or in some cases on the same tray without modification or changing the density of the receptacles 54 for terminating optic fibres.

Figure 5B:
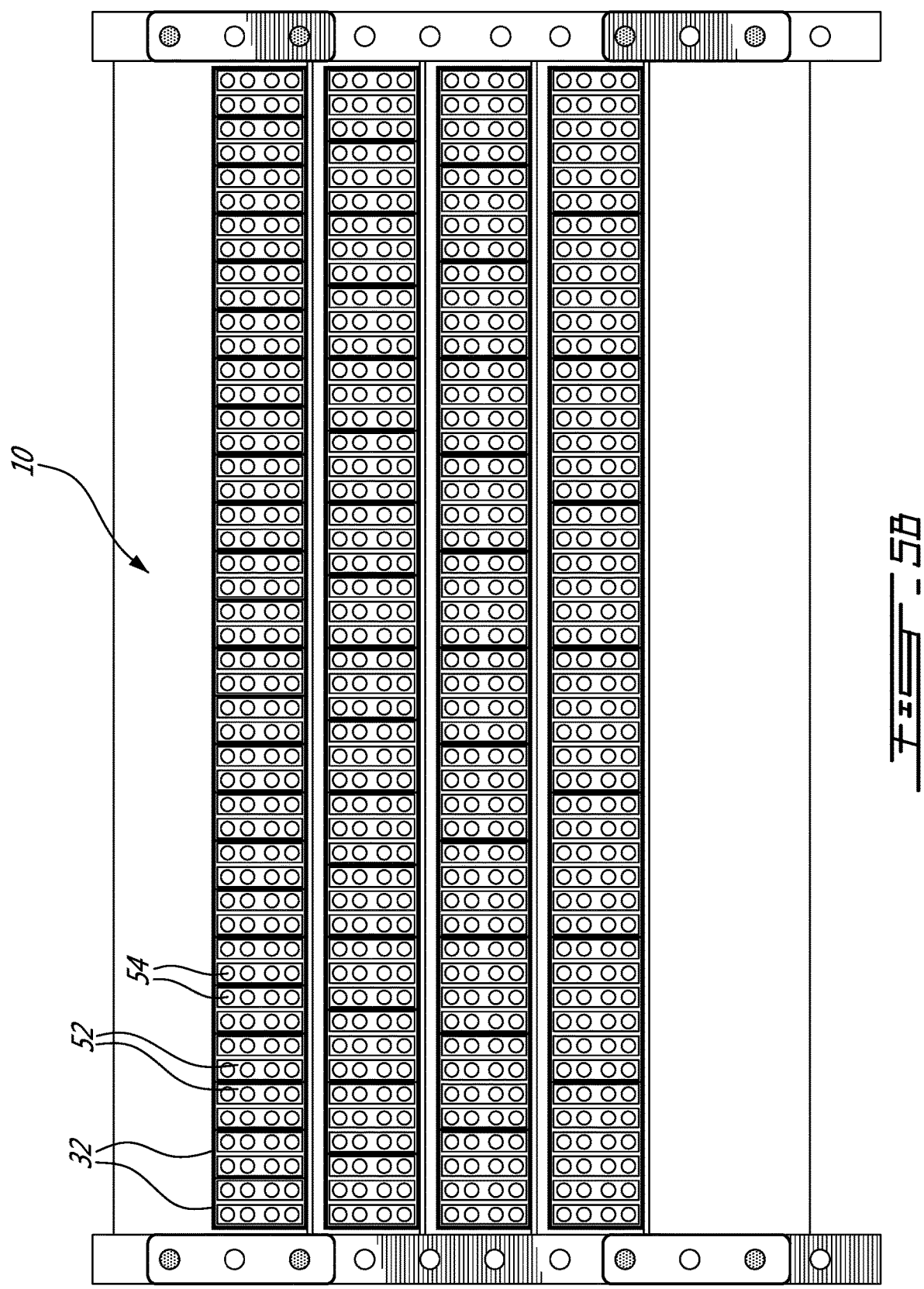

Referring now to FIG. 5B, in a second alternative embodiment of the system each receptacle modules 52 comprises a Quad type module arranged vertically. In a first cassette size two (2) of such quad modules 52 are provided to provide for eight (8) receptacles 54 for terminating a fiber optic cable (not shown) comprised of eight (8) optic fibers. Cassettes comprising three (3), four (4) and six (6) quad type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Referring now to FIG. 5C, in a third alternative embodiment of the system each receptacle modules 52 comprises a duplex type module arranged horizontally in two rows. In a first cassette size four (4) of such duplex modules 52 are provided to provide for eight (8) receptacles 54 for terminating a fiber optic cable (not shown) comprised of eight (8) optic fibers. Cassettes comprising six (6), eight (8) and twelve (12) duplex type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 6B:
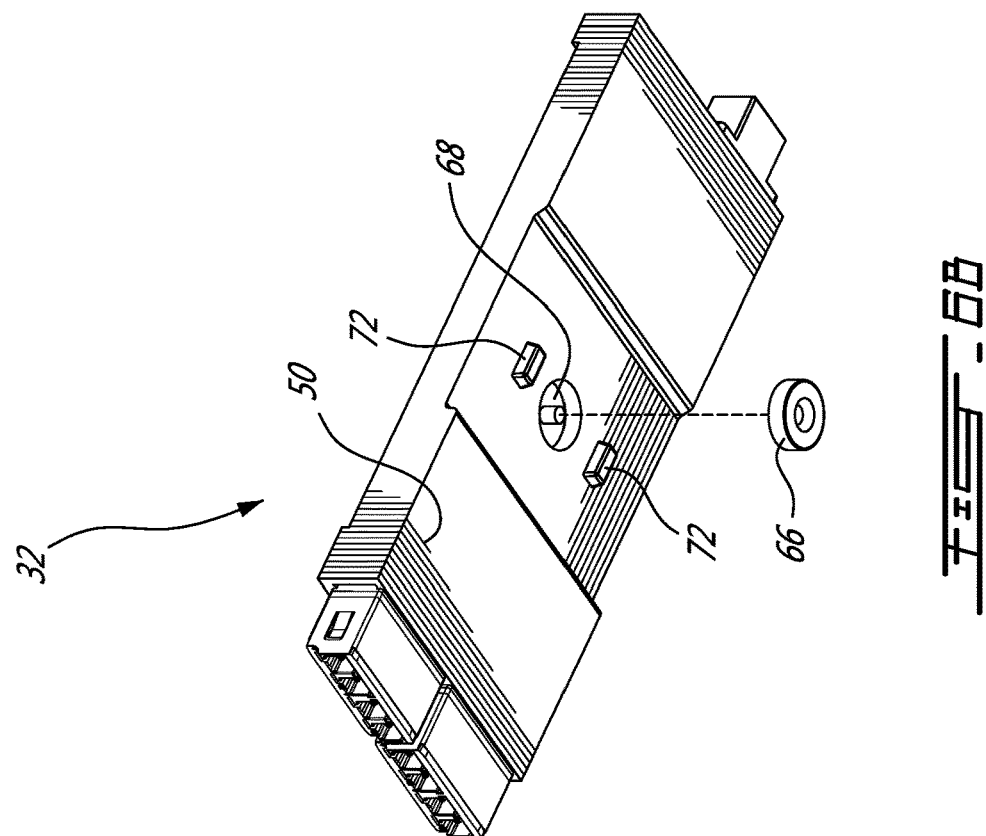
FIGS. 6A and 6B provide respectively a raised right front perspective view and a lowered right front perspective view of a modular fiber optic cassette in accordance with an alternative illustrative embodiment of the present invention.
Figure 6A:
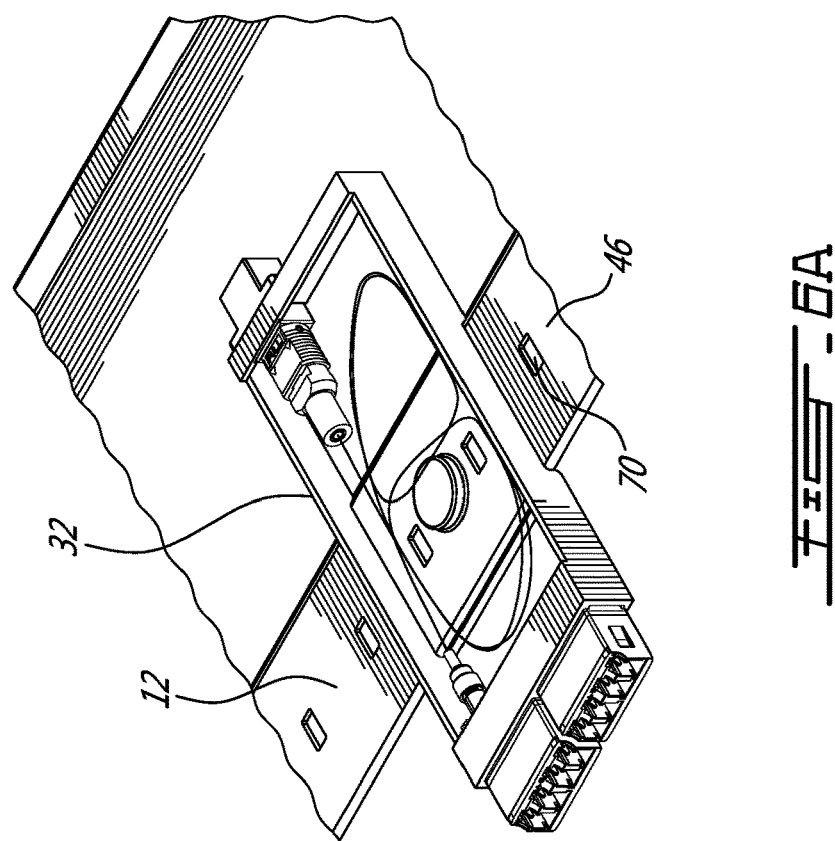

Referring now to FIGS. 6A and 6B in addition to FIG. 1, in an alternative embodiment of an assembly for securing the cassettes 32 to the tray 12 the tray 12 is manufactured from a ferrous material such as steel or the like and the fastener comprises a magnet 66 which is attracted to the tray and embedded or otherwise secured within a recess 68 formed in the underside 50 of the cassette 32. The tray 12, further comprises a series of spaced slots 70 arranged along the raised shoulder 46 which engage bosses 72 to ensure correct positioning of the cassettes 32 on the tray 12.

Figure 7A:
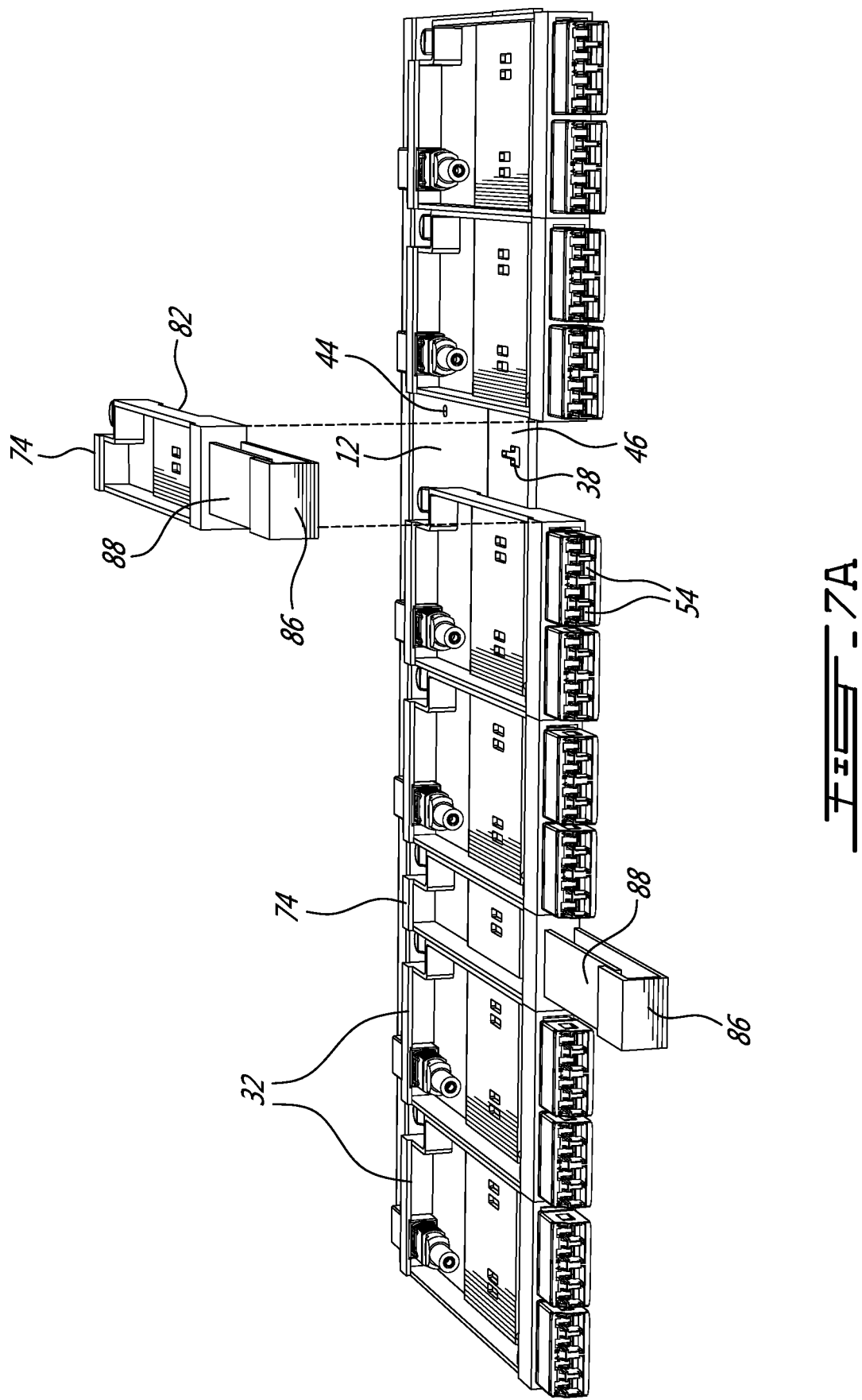
FIGS. 7A and 7B provide respectively a raised right front perspective view of a tray comprising a plurality modular fiber optic cassettes and a pair of cable management brackets and lowered right front perspective view of a cable management bracket in accordance with a second alternative illustrative embodiment of the present invention.
Figure 7B:
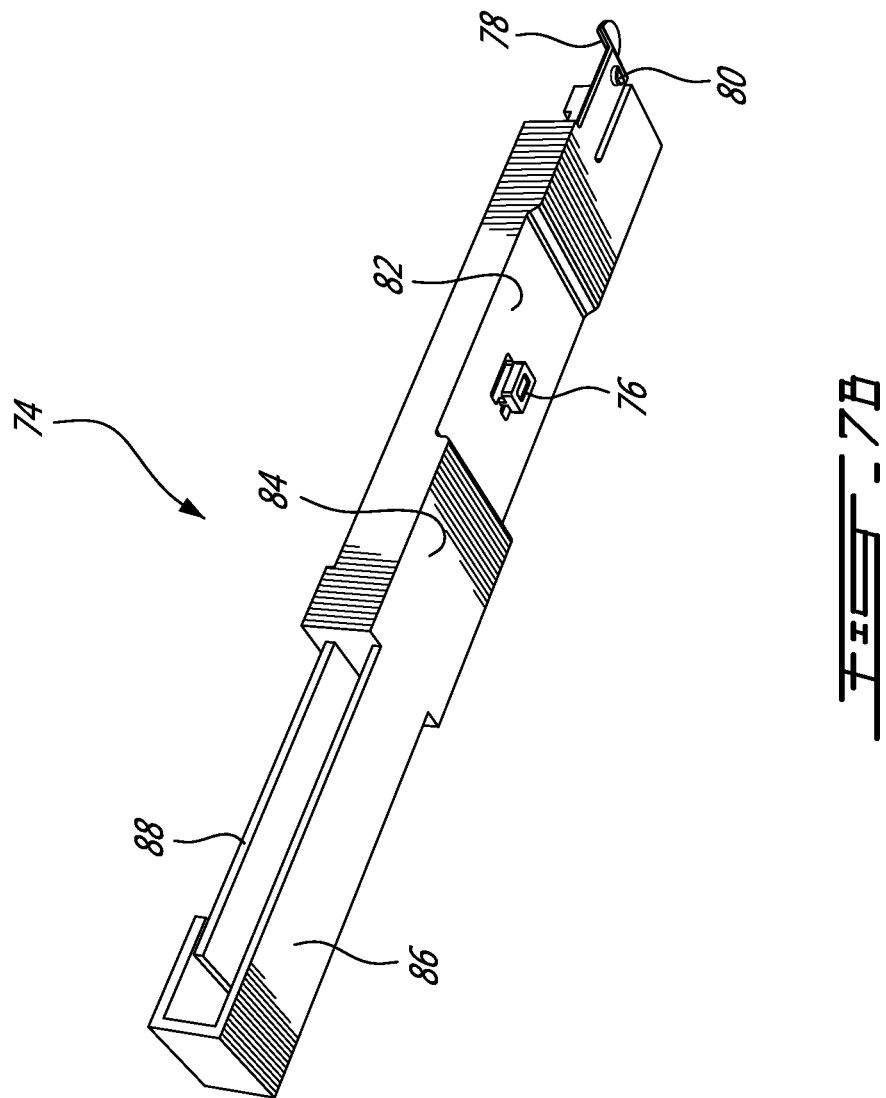

Referring now to FIG. 7A in a second alternative illustrative embodiment other equipment, such as a cable management bracket 74 can be provided with the same width W and such that they can be mounted to together with the cassettes 32 to the tray 12. In this regard, and with reference to FIG. 7B in addition to FIG. 7, the cable management bracket 74 is provided with tabs 76 comprising an inverted "T" cross section which engage with engage a slot 38 on the tray 12. A flexible tab 78 is provided which comprises a boss 80 that engages one of the apertures 44 in the tray 12 when the tab 76 is engaged within its respective slot 38, thereby releasable securing the cable management bracket 74 to the tray 12. In order to better orient the cable management bracket 74 on the tray during installation, the raised shoulder 46 of the tray 12 is received within a channel 82 moulded or otherwise formed in the underside 84 of the cable management bracket 74. Additionally, each cable management bracket 74 includes a cable management loop 86 for receiving a plurality of optic fibres (not shown) which are terminated at respective ones of the receptacles 54. A flexible strip 88 across the mouth of the cable management loop 86 is provided to releasably retain the plurality of optic fibers within the loop 86.

Although the present invention has been described hereinabove by way of specific embodiments thereof, it can be modified, without departing from the spirit and nature of the subject invention as defined in the appended claims.

The invention claimed is:

1. A tray for providing a plurality of different modular fiber optic cassette configurations in a standard U-space fiber optic management system comprising:
   a tray having a first tray side end portion and a second tray side end portion defining a tray width portion that extends between the first tray side end portion and the second tray side end portion;
   wherein the tray width portion fits within a standard U-space width dimension;
   wherein the tray is configured to fit a plurality of different modular fiber optic cassette configurations in the tray width portion in a standard U-space fiber management system;
   wherein each of the plurality of different modular fiber optic cassette configurations include a modular fiber optic cassette that is configured to support a receptable module having a first module side end portion and a second module side end portion defining a module width portion that extends between the first tray side end portion and second tray side end portion;
   wherein the module width portion is configured to fit in a standard one width (1 W) unit;
   wherein each of the modular fiber optic cassettes includes a first cassette side end portion and a second cassette side end portion defining a standard cassette width unit extending between the first cassette side end portion and the second cassette side end portion that comprises a standard two width (2 W) unit, a standard three width (3 W) unit, a standard four width (4 W) unit, or a standard a standard six width (6 W) unit relative to the standard one width (1 W) unit;
   wherein the receptable module is configured to fit at least four fiber optic plug receiving receptacle portions in a standard one width (1 W) unit;
   wherein the plurality of different modular fiber optic cassette configurations comprise:
   a first modular fiber optic cassette configuration that includes six modular two standard width unit (2 W) cassettes that are each arranged side by side of each other along the tray such that a cassette side end portion of each modular two standard width (2 W) cassette adjacently faces a cassette side end portion of at least one other modular two standard width (2 W) cassette;

a second modular fiber optic cassette configuration that includes four modular three standard width unit (3 W) cassettes that are each arranged side by side of each other in a row along the tray such that a cassette side end portion of each modular three standard width (3 W) cassette adjacently faces a cassette side end portion of at least one other modular three standard width (3 W) cassette;

a third modular fiber optic cassette configuration that includes three modular four standard width unit (4 W) cassettes that are each arranged side by side of each other in a row along the tray such that a cassette side end portion of each modular four standard width (4 W) cassette adjacently faces a cassette side end portion of at least one other modular four standard width (4 W) cassette;

a fourth modular fiber optic cassette configuration that includes two modular six standard width unit (6 W) cassettes that are each arranged side by side of each other in a row along the tray such that a cassette side end portion of one of the two modular six standard width (6 W) cassettes adjacently faces a cassette side end portion of the other modular six standard width (6 W) cassette; and a fifth modular fiber optic cassette configuration that includes three modular two standard width unit (2 W) cassettes, which are each arranged side by side of each other in a row along the tray such that a cassette side end portion of one of the three modular two standard width (2 W) cassettes adjacently faces a cassette side end portion of one of the other modular two standard width (2 W) cassette, and one modular six standard width unit (6 W) cassette that is arranged side by side in a row along the tray with one of the three modular two standard width unit (2 W) cassettes, such that a cassette side end portion of the one modular six standard width unit (6 W) cassette adjacently faces a cassette side end portion of one of the other three modular two standard width unit (2 W) cassettes;

wherein each modular two standard width (2 W) cassette is configured to fit two receptacle modules;

wherein each modular three standard width (3 W) cassette is configured to fit three receptacle modules;

wherein each modular four standard width (4 W) cassette is configured to fit four receptacle modules;

wherein each modular six standard width (6 W) cassette is configured to fit six receptacle modules;

wherein the tray is configured to be removably secured to each modular fiber optic cassette when the tray fits the plurality of different modular fiber optic cassette configurations within the tray width portion in the standard U-space fiber management system; and wherein the tray includes a plurality of cassette engaging portions that are configured to conform to the standard one width (1 W) so as to support the modular two standard width (2 W) cassette, the modular three standard width (3 W) cassette, the modular four standard width (4 W) cassette, and the modular six standard width (6 W) cassette.

2. The tray of claim 1, wherein the standard one width (1 W) unit is based on a standard SC Duplex width unit that is configured to fit a plurality of different type of LC, SC, and MPO connectors.

3. The tray of claim 1, wherein the plurality of cassette engaging portions of the tray are spaced apart from one another so as to conform to the standard one width (1 W) and support the modular two standard width (2 W) cassette, the modular three standard width (3 W) cassette, the modular four standard width (4 W) cassette, and the modular six standard width (6 W) cassette.

4. The tray of claim 1, wherein the tray is configured to be slidingly received in at least a portion of a tray receiving space of a case of a fiber optic management system.

5. The tray of claim 1, wherein each of the modular fiber optic cassettes includes a cassette side end portion that is directly adjacent to a cassette side end portion of another module fiber optic cassette when each of the modular fiber optic cassettes are in the plurality of the plurality of different modular fiber optic cassette configurations.

6. The tray of claim 1, wherein each of the modular fiber optic cassettes includes a cassette side end portion that is adjacent to a cassette side end portion of another module fiber optic cassette when each of the modular fiber optic cassettes are in the plurality of the plurality of different modular fiber optic cassette configurations.

7. The tray of claim 1, wherein each of the modular fiber optic cassettes includes a cassette side end portion that touches a cassette side end portion of another module fiber optic cassette when each of the modular fiber optic cassettes are in the plurality of the plurality of different modular fiber optic cassette configurations.

8. The tray of claim 1, wherein the tray has a first tray end portion, a second tray end portion spaced away from the first tray end portion so as to define a tray width extending between the first tray end portion and the second tray end portion, and wherein the tray width is configured to fit at least twelve standard one width (1 W) units side by side along the tray width.

9. A tray for providing a plurality of different modular fiber optic cassette configurations in a standard U-space fiber optic management system comprising:

a tray configured to fit in a standard U-space and support a plurality of different modular fiber optic cassette configurations in the standard U-space;

wherein each of the plurality of different modular fiber optic cassette configurations includes a plurality of different sizes of modular fiber optic cassettes;

wherein each of the plurality of different sizes of modular fiber optic cassettes is configured to support a fiber optic receptable module that is configured to fit in a standard one width (1 W) unit;

wherein the plurality of different sizes of modular fiber optic cassettes include a 2 cassette size that is configured to fit a standard two width (2 W) unit relative to the standard one width (1 W) unit, a 3 W cassette size that is configured to fit a standard three width (3 W) unit relative to the standard one width (1 W) unit, a 4 W cassette size that is configured to fit a standard four width (4 W) unit relative to the standard one width (1 W) unit, and a 6 W cassette size that is configured to fit a standard six width (6 W) unit relative to the standard one width (1 W) unit;

wherein the plurality of different modular fiber optic cassette configurations comprise:

a first modular fiber optic cassette configuration that includes six modular 2 standard width unit size cassettes that are each arranged side by side of each other along the tray such that a cassette side end portion of each modular 2 standard width unit size cassette adjacently faces a cassette side end portion of at least one other modular 2 standard width size cassette;

a second modular fiber optic cassette configuration that includes four modular 3 W standard width unit size cassettes that are each arranged side by side of each other in a row along the tray such that a cassette side end portion of each modular 3 W standard width size cassette adjacently faces a cassette side end portion of at least one other modular 3 W standard width size cassette;

a third modular fiber optic cassette configuration that includes three modular 4 W standard width unit size cassettes that are each arranged side by side of each other in a row along the tray such that a cassette side end portion of each modular 4 W standard width size cassette adjacently faces a cassette side end portion of at least one other modular 4 W standard width size cassette;

a fourth modular fiber optic cassette configuration that includes two modular 6 W standard width unit size cassettes that are each arranged side by side of each other in a row along the tray such that a cassette side end portion of one of the two modular 6 W standard width size cassettes adjacently faces a cassette side end portion of the other modular 6 W standard width size cassette; and a fifth modular fiber optic cassette configuration that includes three modular 2 standard width unit size cassettes, which are each arranged side by side of each other in a row along the tray such that a cassette side end portion of one of the three modular 2 standard width size cassettes adjacently faces a cassette side end portion of one of the other modular 2 standard width size cassette, and one modular 6 W standard width unit size cassette that is arranged side by side in a row along the tray with one of the three modular 2 standard width unit size cassettes, such that a cassette side end portion of the one modular 6 W standard width unit size cassette adjacently faces a cassette side end portion of one of the other three modular 2 standard width unit size cassettes;

wherein the tray is configured to be removably secured to each modular fiber optic cassette when the tray fits the plurality of different modular fiber optic cassette configurations within a tray width portion in the standard U-space fiber management system; and wherein the tray includes a plurality of cassette engaging portions that are configured to conform to the standard one width (1 W) so as to support the modular 2 standard width unit size cassette, the modular 3 W standard width unit size cassette, the modular 4 W standard width unit size cassette, and the modular 6 W standard width unit size cassette.

10. The tray of claim 9, wherein the standard one width (1 W) unit is based on a standard SC Duplex width unit that is configured to fit a plurality of different type of LC, SC, and MPO connectors.

11. The tray of claim 9, wherein the plurality of cassette engaging portions of the tray are spaced apart from one another so as to conform to the standard one width (1 W) and support the modular 2 standard width unit size cassette, the modular 3 W standard width unit size cassette, the modular 4 W standard width unit size cassette, and the modular 6 W standard width unit size cassette.

12. The tray of claim 9, wherein the tray is configured to be slidingly received in at least portion of a tray receiving space of a case of a fiber optic management system.

13. The tray of claim 9, wherein each of the modular fiber optic cassettes includes a cassette side end portion that is directly adjacent to a cassette side end portion of another module fiber optic cassette when each of the modular fiber optic cassettes are in the plurality of the plurality of different modular fiber optic cassette configurations.

14. The tray of claim 9, wherein each of the modular fiber optic cassettes includes a cassette side end portion that is adjacent to a cassette side end portion of another module fiber optic cassette when each of the modular fiber optic cassettes are in the plurality of the plurality of different modular fiber optic cassette configurations.

15. The tray of claim 9, wherein each of the modular fiber optic cassettes includes a cassette side end portion that touches a cassette side end portion of another module fiber optic cassette when each of the modular fiber optic cassettes are in the plurality of the plurality of different modular fiber optic cassette configurations.

16. The tray of claim 9, wherein the tray has first tray end portion, a second tray end portion spaced away from the first tray end portion so as to define a tray width extending between the first tray end portion and the second tray end portion, and wherein the tray width is configured to support at least twelve standard one width (1 W) units side by side along the tray.

17. A tray for providing a plurality of different modular fiber optic cassette configurations in a fiber optic management system comprising:

a tray member configured to support a plurality of different modular fiber optic cassette configurations in a standard U-space width;

wherein the plurality of different modular fiber optic cassette configurations include different sizes of modular fiber optic cassettes;

wherein each of the different sizes of modular fiber optic cassettes is configured to support a fiber optic receptable module that is configured to fit in a standard one width (1 W) unit;

wherein the plurality of different sizes of modular fiber optic cassettes include a 2 cassette size that is configured to fit a standard two width (2 W) unit relative to the standard one width (1 W) unit, a 3 W cassette size that is configured to fit a standard three width (3 W) unit relative to the standard one width (1 W) unit, a 4 W cassette size that is configured to fit a standard four width (4 W) unit relative to the standard one width (1 W) unit, and a 6 W cassette size that is configured to fit a standard six width (6 W) unit relative to the standard one width (1 W) unit;

wherein the plurality of different modular fiber optic cassette configurations comprise:

a first modular fiber optic cassette configuration that includes six modular 2 standard width unit size cassettes that are each arranged side by side of each other along the tray member such that a cassette side end portion of each modular 2 standard width unit size cassette adjacently faces a cassette side end portion of at least one other modular 2 standard width size cassette;

a second modular fiber optic cassette configuration that includes four modular 3 W standard width unit size cassettes that are each arranged side by side of each other in a row along the tray member such that a cassette side end portion of each modular 3 W standard width size cassette adjacently faces a cassette side end portion of at least one other modular 3 W standard width size cassette;

a third modular fiber optic cassette configuration that includes three modular 4 W standard width unit size cassettes that are each arranged side by side of each other in a row along the tray member such that a cassette side end portion of each modular 4 W standard width size cassette adjacently faces a cassette side end portion of at least one other modular 4 W standard width size cassette; and a fourth modular fiber optic cassette configuration that includes two modular 6 W standard width unit size cassettes that are each arranged side by side of each other in a row along the tray member such that a cassette side end portion of one of the two modular 6 W standard width size cassettes adjacently faces a cassette side end portion of the other modular 6 W standard width size cassette; and wherein the tray member is configured to conform to the standard one width (1 W) so as to support the modular 2 standard width unit size cassette, the modular 3 W standard width unit size cassette, the modular 4 W standard width unit size cassette, and the modular 6 W standard width unit size cassette.

18. The tray member of claim 17, wherein the standard one width (1 W) unit is based on a standard SC Duplex width unit that is configured to fit a plurality of different type of LC, SC, and MPO connectors.

19. The tray member of claim 17, wherein the tray member includes a row of cassette engaging portions that are spaced apart from one another so as to conform to the standard one width (1 W) and support the modular 2 standard width unit size cassette, the modular 3 W standard width unit size cassette, the modular 4 W standard width unit size cassette, and the modular 6 W standard width unit size cassette.

20. The tray member of claim 19, wherein the row of cassette engaging portions comprises a first row of cassette engaging portions, and the tray includes a second row of cassette engaging portions that is spaced away from the first row of cassette engaging portions.

21. The tray member of claim 20, wherein the first row of cassette engaging portion comprises a first row of slot portions that are each configured to engage a tab portion of each modular cassette.

22. The tray member of claim 17, wherein the tray member is configured to be slidingly received in at least portion of a tray member receiving space of a case of a fiber optic management system.

23. The tray member of claim 17, wherein each of the modular fiber optic cassettes includes a cassette side end portion that is directly adjacent to a cassette side end portion of another module fiber optic cassette when each of the modular fiber optic cassettes are in the plurality of the plurality of different modular fiber optic cassette configurations.

24. The tray member of claim 17, wherein each of the modular fiber optic cassettes includes a cassette side end portion that is adjacent to a cassette side end portion of another module fiber optic cassette when each of the modular fiber optic cassettes are in the plurality of the plurality of different modular fiber optic cassette configurations.

25. The tray member of claim 17, wherein each of the modular fiber optic cassettes includes a cassette side end portion that touches a cassette side end portion of another module fiber optic cassette when each of the modular fiber optic cassettes are in the plurality of the plurality of different modular fiber optic cassette configurations.

26. The tray member of claim 17, wherein the tray member has a tray member width that is configured to support at least twelve standard one width (1 W) units side by side along a row.

27. The tray member of claim 17, wherein the tray member has first tray member end portion, a second tray member end portion spaced away from the first tray member end portion so as to define a tray member width extending between the first tray member end portion and the second tray member end portion, and wherein the tray member width is configured to support at least twelve standard one width (1 W) units side by side along the tray member.

28. The tray member of claim 17, wherein each of the modular fiber optic cassettes comprises a multi-fiber connector receiving receptacle portion arranged on a rear portion thereof.

29. The tray member of claim 17, wherein each of the modules fiber optic cassettes comprises four fiber optic plug receiving receptacle portions configured to be arranged side by side in a row along a front portion thereof for each standard width (1 W) unit.

30. The tray member of claim 17, wherein the tray member comprises a cassette fastening portion that is configured to removably secure the tray member to each modular fiber optic cassette.

\* \* \* \* \*

UNITED STATES PATENT AND TRADEMARK OFFICE
CERTIFICATE OF CORRECTION

PATENT NO. : 11,740,423 B2
APPLICATION NO. : 18/105639
DATED : August 29, 2023
INVENTOR(S) : Vincent Pilon Page 1 of 1

It is certified that error appears in the above-identified patent and that said Letters Patent is hereby corrected as shown below:

In the Claims

At Column 12, Line 48, Claim 9, please change "2" to --2 W--.
At Column 12, Line 61, Claim 9, please change "2" to --2 W--.
At Column 12, Line 64, Claim 9, please change "2" to --2 W--.
At Column 12, Line 66, Claim 9, please change "2" to --2 W--.
At Column 13, Line 26, Claim 9, please change "2" to --2 W--.
At Column 13, Line 29, Claim 9, please change "2" to --2 W--.
At Column 13, Line 31, Claim 9, please change "2" to --2 W--.
At Column 13, Line 35, Claim 9, please change "2" to --2 W--.
At Column 13, Line 39, Claim 9, please change "2" to --2 W--.
At Column 13, Line 47, Claim 9, please change "2" to --2 W--.
At Column 13, Line 59, Claim 11, please change "2" to --2 W--.
At Column 14, Line 38, Claim 17, please change "2" to --2 W--.
At Column 14, Line 51, Claim 17, please change "2" to --2 W--.
At Column 14, Line 54, Claim 17, please change "2" to --2 W--.
At Column 14, Line 56, Claim 17, please change "2" to --2 W--.
At Column 15, Line 17, Claim 17, please change "2" to --2 W--.
At Column 15, Line 28, Claim 19, please change "2" to --2 W--.

Signed and Sealed this
Twenty-sixth Day of September, 2023

Katherine Kelly Vidal
*Director of the United States Patent and Trademark Office*